(12) United States Patent
Mathiske et al.

(10) Patent No.: US 6,829,686 B2
(45) Date of Patent: Dec. 7, 2004

(54) METHOD AND APPARATUS FOR BAG-TO-SET, BUFFERING REMEMBERED SET

(75) Inventors: Bernd J. W. Mathiske, Cupertino, CA (US); Ross C. Knippel, Half Moon Bay, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 725 days.

(21) Appl. No.: 09/779,322

(22) Filed: Feb. 8, 2001

(65) Prior Publication Data

US 2002/0107667 A1 Aug. 8, 2002

(51) Int. Cl.⁷ .............................................. G06F 12/00
(52) U.S. Cl. ..................... 711/159; 711/170; 707/206
(58) Field of Search ................................. 711/159, 170; 707/206

(56) References Cited

U.S. PATENT DOCUMENTS 6,510,440 B1 * 1/2003 Alpern et al. ............... 707/206

* cited by examiner

*Primary Examiner*—Reginald G. Bragdon
(74) *Attorney, Agent, or Firm*—Osha & May L.L.P.

(57) ABSTRACT

A method for providing a remembered set involves maintaining the remembered set as a bag, identifying when an event occurs, and transforming the remembered set into a set when the event occurs. The step of transforming includes obtaining a plurality of thread local store buffers and flushing the thread local store buffers to a global store buffer.

33 Claims, 7 Drawing Sheets

TRANSFORMING THE BAG TO A SET

BAG-TO-SET

TRANSFORMING THE BAG TO A SET

TRANSFORMING THE BAG TO A SET

DUPLICATE PREVENTION

LOCAL STORE BUFFER SHRINKING

METHOD AND APPARATUS FOR BAG-TO-SET, BUFFERING REMEMBERED SET

BACKGROUND OF THE INVENTION

1. Field of the Invention

The present invention relates to a method and apparatus for bag-to-set, buffering remembered set.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

A "remembered set" is a set of objects that are represented in computer software. Normally the objects in the remembered set are objects that have been updated during a given time interval. Write barriers often are used to determine which objects belong in the remembered set. Before further discussing write barriers and their application to remembered sets, an overview of objects and object oriented programming is helpful.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is the to be of the same type or class.

To illustrate, an employee object class can include "name" and "salary" instance variables and a "set.sub.-salary" method. Instances of the employee object class can be created, or instantiated for each employee in an organization. Each object instance is the to be of type "employee." Each employee object instance includes "name" and "salary" instance variables and the "set.sub.-salary" method. The values associated with the "name" and "salary" variables in each employee object instance contain the name and salary of an employee in the organization. A message can be sent to an employee's employee object instance to invoke the "set.sub.-salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. The parent class is also referred to as a "superclass." Each subclass in the hierarchy may add to or modify the behavior specified by its parent class. Some object-oriented programming languages support multiple inheritance where a subclass may inherit a class definition from more than one parent class. Other programming languages, such as the Java programming language, support only single inheritance, where a subclass is limited to inheriting the class definition of only one parent class. The Java programming language also provides a mechanism known as an "interface" which comprises a set of constant and abstract method declarations. An object class can implement the abstract methods defined in an interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Write Barriers

Write barriers are inserted into computer programs so that the program can keep track of and/or trigger reactions when data items of interest are modified. Pages, objects, records, arrays, fields, array elements, documents, and paragraphs provide a few examples of data items that may be of interest when implementing a write barrier.

One application of a write barrier is for the tracking of inter-generational pointers in a garbage collector. A pointer is a memory address that indicates where data can be found. Garbage collection is a part of a language's runtime system, or an add-on library, perhaps assisted by the compiler, the hardware, the operating system, or any combination of the three, that automatically determines what memory a program is no longer using, and recycles it for other use.

Often it is advantageous in garbage collection to know which pointers point from one generation to another (i.e., inter-generational pointers), or which pointers point from one area of memory to another area of memory. To find such pointers, one current scheme determines which pointers are already inter-generational. Then, when an object is updated, the garbage collector will only look at the inter-generational pointers to determine if they have been changed rather than looking at every pointer.

Another use of a write barrier is in the tracking of cache-resident objects in persistent object caching. In general, caches are implemented under the assumption that it is very likely that some object or piece of data will be repeatedly accessed. Access delays are minimized by keeping popular data close to the entity which needs it. Persistent objects are forms of data that continue to exist, even after the process that created them has stopped executing. When an executing process is using a persistent object there is a benefit to caching such an object, namely, the object can be accessed in memory rather than on disk and a memory access is quicker than a disk access.

In a garbage collector or a persistent object cache, all updates are recorded in the remembered set. Remembered sets are typically implemented using either a "store buffer" technique or a "card marking" technique.

Store Buffers

A store buffer is a stack of pointers to one or more updated entities. A store buffer can be a "bag" or a "set". Updated entities are added to a bag immediately and every time an object is updated. Hence, a store buffer in the form of a bag may contain a plurality of duplicate entries for the same object as it is updated over time.

To be more efficient, some current schemes represent the remembered set with no duplicate entries. Using this approach, the remembered set is a true set and not a bag. To implement a store buffer in the form of a true set, objects are given a "dirty mark" when added to the set. Then, if the object is updated again in the future, if the object has a dirty mark, it is not added again to the store buffer. With a true set, the scanning of entries is significantly more efficient.

One disadvantage in using a store buffer is that they require many additional instructions to implement the marking strategy. These many additional instructions add to the code needed to execute the computer program and are sometimes termed as causing a "code bloat". Store buffers are frequently used as remembered sets in interpreters, but not in compilers.

Card Marking

Using a card marking approach, a range of memory is defined. Then, evenly spaced chunks of memory are allocated. The size of the chunk, for instance, can be 512 or 1024 bytes. The specific size of the chunk, however, can vary with different implementations. Then, each chunk in memory is identified with a bit. By modifying the bit, for instance by assigning the bit a non-zero value, it indicates that a specific range of memory has been updated.

Systems that compile to machine code often use card marking, because much fewer instructions than a store buffer are needed to identify whether a much larger range of memory addresses has been updated. Thus, card marking causes less code bloat then store buffers. Card marking, however, creates a bag because although it takes little code bloat to identify which ranges have been updated, the code must still scan through the entire memory range to identify with specificity which objects have been updated.

In many instances, having a bag creates an even larger cost then the cost associated with bloated code, particularly in programs where updates are occurring frequently to a small subset of the objects in memory. Also, a true scan of the entire remembered set is relatively rare. For instance, a garbage collection or checkpoint operation, which may scan the entire remembered set, only occur occasionally in the life cycle of an executing computer process. In these instances, continually scanning ranges of memory for the same objects over and over is extremely disadvantageous and wasteful of computer resources.

Costs Associated with Write Barriers

Several costs are associated with the insertion of write barriers into program code. First, inserted write barrier instructions increase execution time. Second, adding write barrier instructions increases the amount of code in the computer program (i.e., code bloat). Finally, the execution time needed to process the data accumulated by write barriers increases (i.e., the program must handle the additional data in the store buffer).

The performance of code caching, including virtual memory (paging), suffers when code becomes bloated. In dynamic compilation systems, (Java technology environments, for instance), the code cache overflows more often, and thus, more frequent recompilations become necessary when the code becomes bloated.

A store buffer is typically scanned by garbage collection or persistent checkpointing to process each entity in the remembered set. If a computer program is to be responsive to user interaction, there is a limit to how long a user-observable progress pause like a garbage collection or a persistent checkpoint is allowed to take. As programs grow larger and larger, processing of large runtime system data sets, such as scanning remembered sets accumulated by write barriers, can become prohibitively slow. Thus, minimizing the execution time needed to process the data accumulated by write barriers is crucial.

When there is a large cost associated with having bloated code and the execution time of handling data related to the write barrier increases, current schemes become disadvantageous. A store buffer scheme whose write barrier can be implemented with as few instructions as required by typical card marking barriers would be attractive to compilation systems.

SUMMARY OF THE INVENTION

The present invention provides a method and apparatus for a bag-to-set, buffering remembered set. Card marking provides the ability to implement a write barrier with very few instructions. A store buffer provides fast and easy access to the updated objects observing the write barrier. One or more embodiments of the present invention combine the advantages of card marking and a store buffer to implement write barriers.

In accordance with the present invention, a remembered set is initially maintained as a bag. Then, at evenly spaced intervals over the execution of the computer program (or at other intervals), the bag is transformed into a set. By transforming the bag to a set at various intervals in the program's execution, the user observable pause associated with write barrier code becomes minimal or non-existent. In addition, when a process uses the remembered set, a garbage collector or persistent checkpoint, for instance, the remembered set can be scanned more efficiently.

In one embodiment, the addresses of all updated objects are pushed to a thread local store buffer, which can take the form of a stack data structure. When the thread local stack overflows, the local stack is flushed to a global store buffer, which can also be a stack. In one embodiment, memory protection mechanisms determine when the thread local stack has overflowed. In another embodiment, a user trap is utilized to handle the overflowing of the thread local stack.

The threads comprise concurrent paths of execution within a single computer program. Thus, a plurality of threads that make up a single executing process may have their local stacks flushed to the global store buffer in the manner described by the invention. When flushing the local store buffer to the global store buffer, one embodiment of the invention uses a duplicate prevention scheme.

In the duplicate prevention embodiment, the global store buffer may contain free space after the local store buffer is flushed. If this happens, a local store buffer shrinking scheme is employed by an embodiment of the invention. In this embodiment, the local store buffer is re-allocated an amount of space to match the global store buffer's contiguous free space. This re-allocation continues until the local store buffer's space allocation falls below a predetermined and variable minimum threshold. When the minimum threshold is reached the local store buffer's allocation is reset to the original allocation size and write barriers continue to be observed.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for bag-to-set, buffering remembered set. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Threads

Designing software as a group of cooperating processes has been made simpler by the concept of "threads." A single process may contain several executable programs (threads) that work together as a coherent whole. One thread might, for example, handle error signals, another might send a message about the error to the user, while a third thread is executing the actual task of the process. Modem operating systems provide management services (e.g., scheduling, synchronization) for such multithreaded processes.

Each thread has a thread-local store buffer that can take the form of a stack data structure. A stack is a set of items in which only the most recently added item may be removed. The latest added item is at the top of the stack. The basic operations that can be performed on a stack are push and pop. When an update occurs, the pointer to the updated entity is pushed on the thread's local stack. The write barrier that implements this simple push requires only a few instructions, depending on processor architecture typically 1 or 2.

Bag-to-Set Transformation

In accordance with one or more embodiments of the present invention, a remembered set is maintained as a bag. Then, at evenly spaced intervals (or other intervals) over the execution of the computer program, the bag is transformed into a set. By transforming the bag to a set at intervals in the program's execution, the user observable pause associated with write barrier code becomes minimal or non-existent. In addition, the transformed remembered set is utilized more efficiently by a process that needs the remembered set, a garbage collector or persistent checkpointer, for instance.

Figure 1:
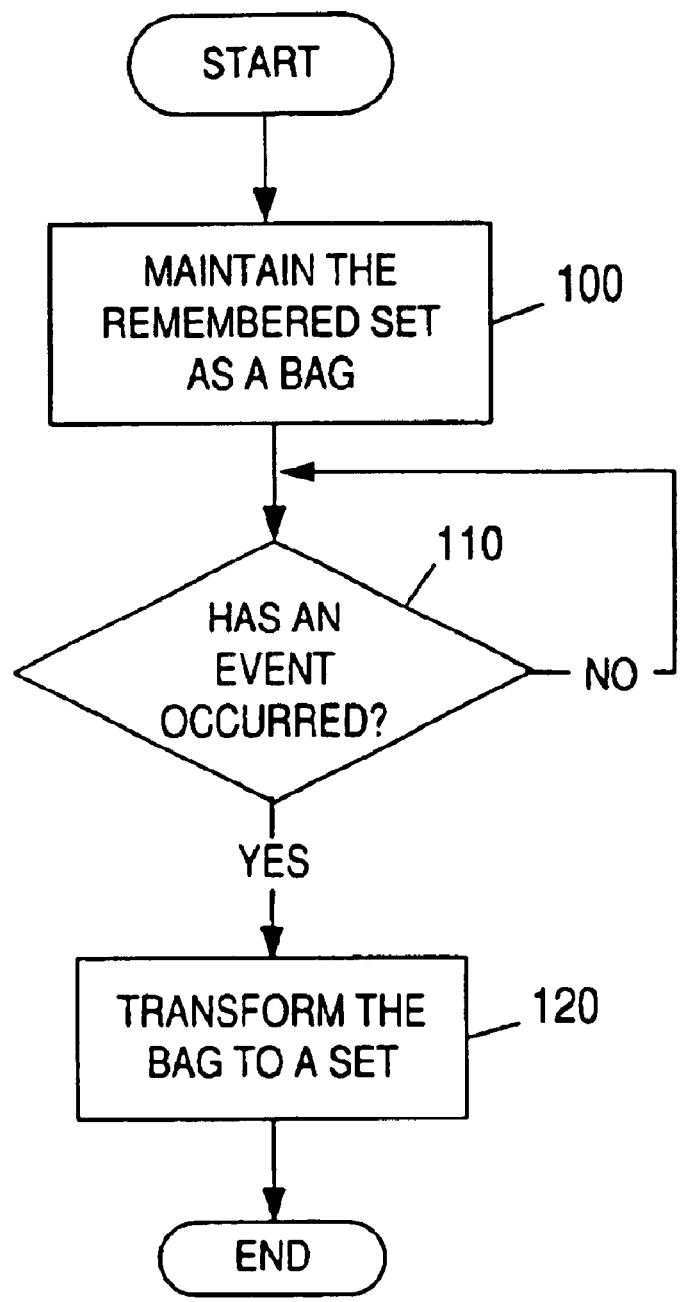
FIG. 1 is a flowchart showing how a remembered set is transformed from a bag to a set in accordance with an embodiment of the present invention.

FIG. 1 is a flowchart showing how a remembered set is transformed from a bag to a set in accordance with an embodiment of the present invention. At step 100 the remembered set is initially maintained as a bag. Then, at step 110, it is determined whether an event has occurred, the occurrence of which will cause the bag to be transformed to a set. The event can be the passing of a given time interval, for instance. If the event has not occurred, execution continues and the process continues to query whether the event has occurred at step 110. When the event occurs, the bag is transformed to a set at step 120.

In one embodiment, the addresses of all updated objects are pushed to a thread local stack. The global remembered set is organized as a stack that grows in chunks of equal size as the thread-local store buffers and by pointer elements within each chunk. When the thread local stack overflows, the local stack is flushed to a global store buffer. The threads comprise concurrent paths of execution within a single computer program Thus, a plurality of threads that make up a single executing process may have their local stacks flushed to the global store buffer in this manner.

Figure 2:
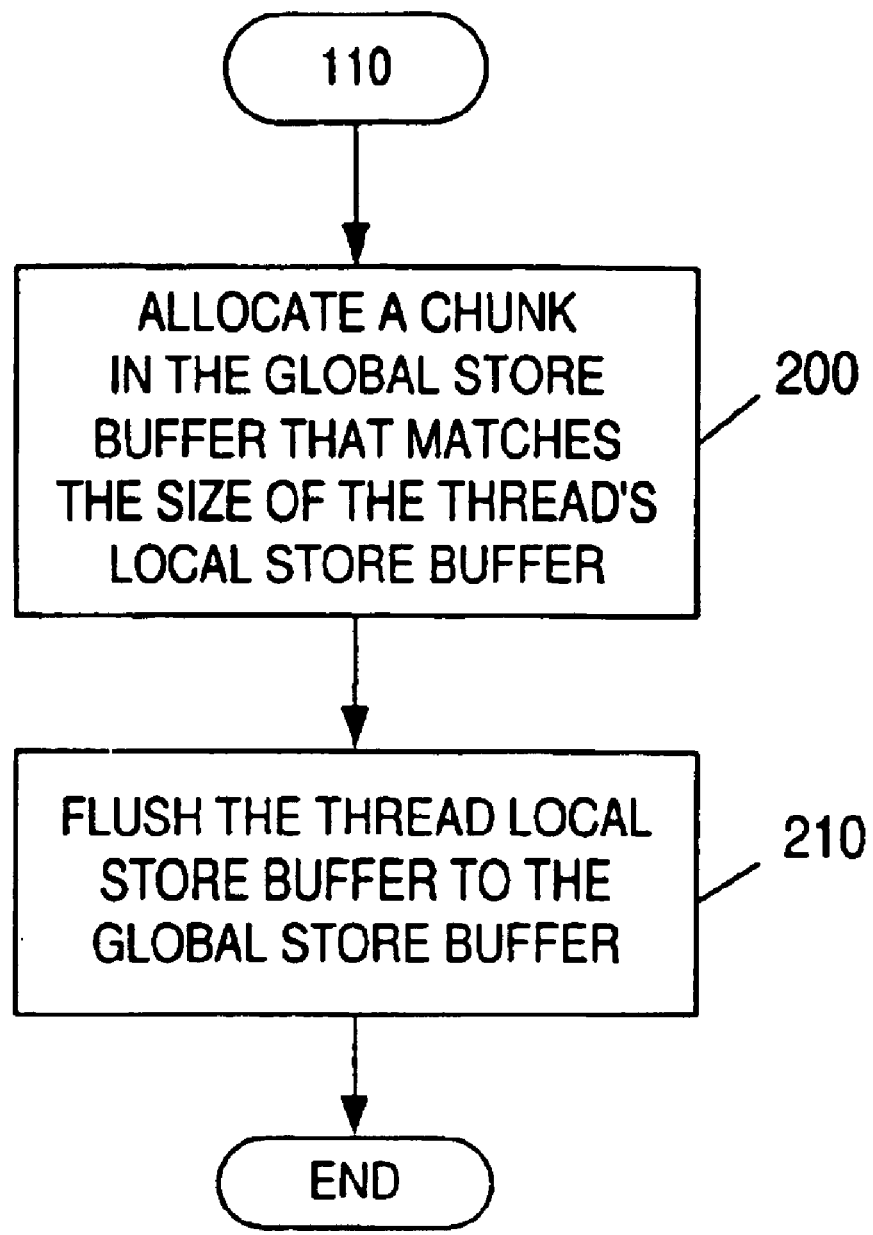
FIG. 2 is a flowchart showing how a remembered set is transformed from a bag to a set in accordance with another embodiment of the present invention.

The flushing of the local stack to the global store buffer is how one or more embodiments of the present invention transform the remembered set in the form of a bag to a remembered set in the form of a true set as described in step 120 of FIG. 1. FIG. 2 describes in more detail the process of transforming a bag to a set in accordance with an embodiment of the present invention. For each running thread, a chunk in the global store buffer that matches the size of the thread's local store buffer is allocated at step 200. Next, at step 210, the thread-local store buffer is flushed to the global store buffer. This flushing can occur, for instance when the thread's local store buffer overflows.

Figure 3:
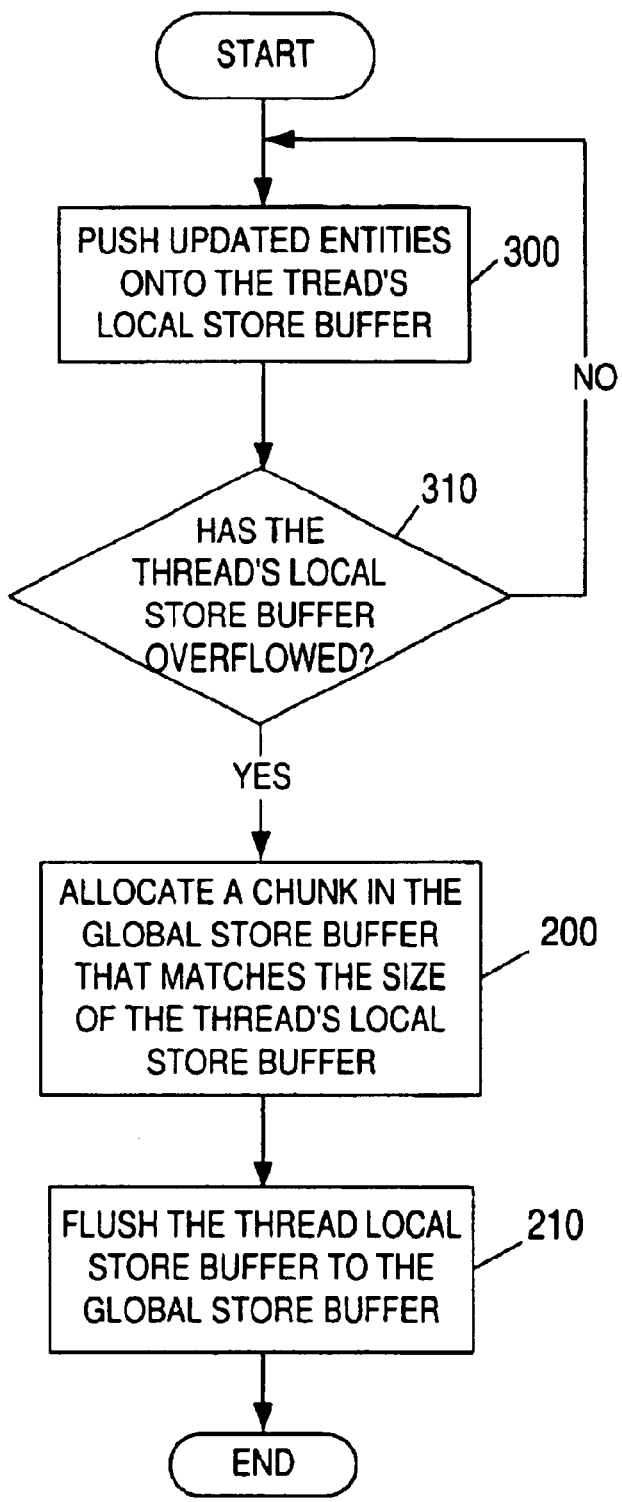
FIG. 3 is a flowchart showing how a remembered set is transformed from a bag to a set in accordance with yet another embodiment of the present invention.

FIG. 3 describes the process of transforming a bag to a set in accordance with another embodiment of the present invention. At step 300, the remembered set is initially maintained as a bag, that is, each and every updated entity observing a write barrier is pushed onto the thread's local store buffer. Then, at step 310 it is determined whether the thread's local store buffer has overflowed. If the local store buffer has not overflowed, the bag continues to be maintained (i.e., each and every updated entity continues to be pushed into its local store buffer). If at step 310 it is determined that the local store buffer has overflowed, then a chunk in the global store buffer that matches the size of the thread's local store buffer is allocated at step 200. Thereafter, at step 210, the thread-local store buffer is flushed to the global store buffer.

Figure 4:
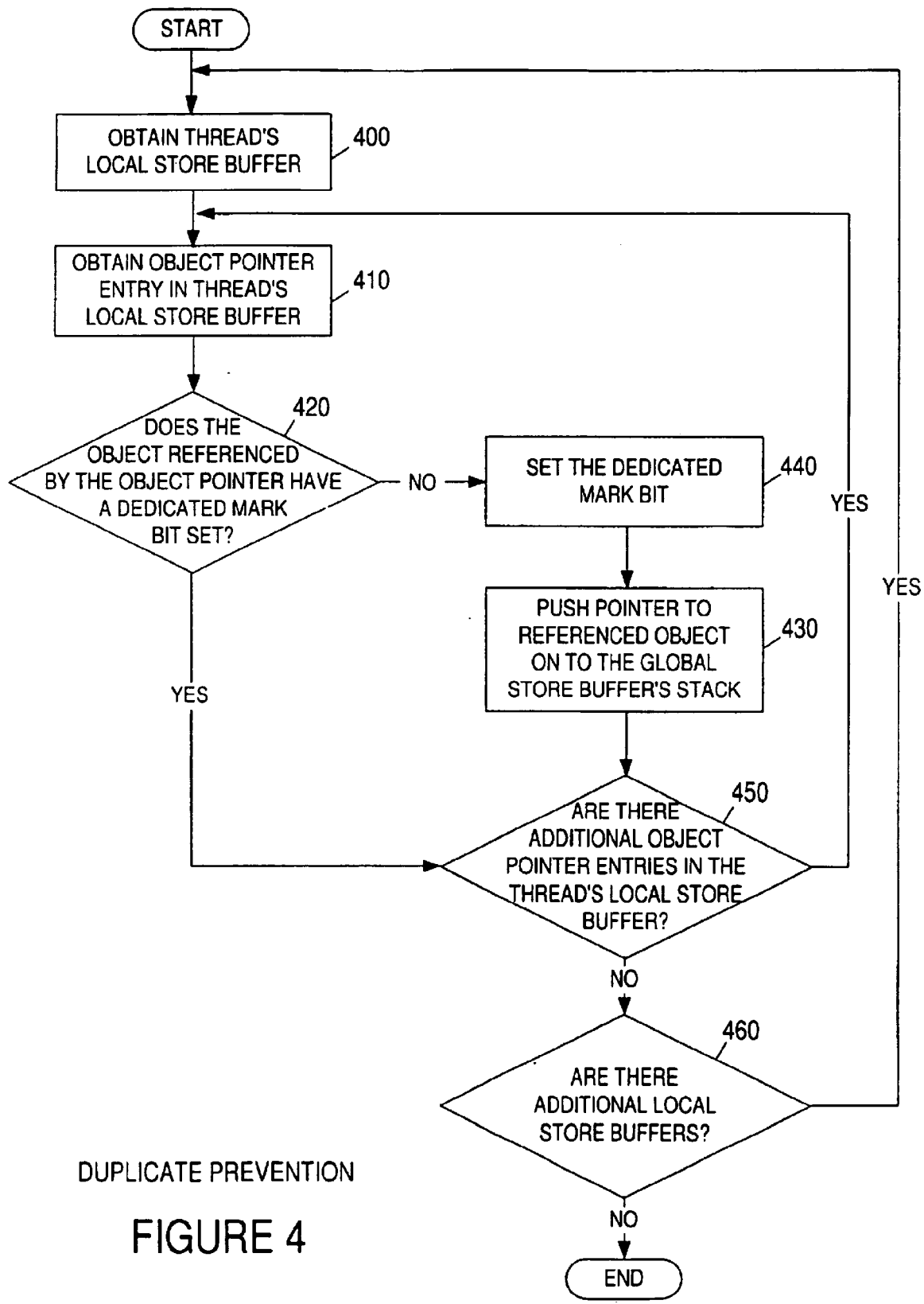
FIG. 4 is a flowchart showing the manner in which the local store buffer is flushed to the global store buffer in order to achieve a bag to set transformation with duplicate prevention in accordance with an embodiment of the present invention.

In one embodiment, chunk allocation in the global store buffer at step 200 of FIG. 2 is performed by incrementing a global stack top pointer with an atomic set-and-test operation. In another embodiment, flushing of the local store buffer to the global store buffer as shown at step 210 of FIG. 2 can be performed as described in FIG. 4. FIG. 4 is a flowchart showing the manner in which an embodiment of the present invention flushes the local store buffer to the global store buffer in order to achieve a bag to set transformation, termed "duplicate prevention".

Duplicate Prevention

The duplicate prevention scheme of an embodiment of the present invention begins at step 400, where a thread's local store buffer is obtained. Then, at step 410, an object pointer entry in the thread's local store buffer is obtained. Next, at step 420, it is determined whether the object referenced by the object pointer has a dedicated mark bit set. If the dedicated mark bit is not set, then it is set at step 440 and the pointer to the referenced object is pushed onto the global store buffer's stack within the chunk related to the current thread at step 430.

After step 430 or if the object referenced by the object pointer has a dedicated mark bit set at step 420, then it is determined whether there are additional object pointer entries in the thread's local store buffer at step 450. If there are additional entries, the process repeats at step 410. Otherwise, the process is complete for that particular thread's local store buffer. In that case, it is next determined whether there are additional local store buffers to flush to the global store buffer at step 460. If there are additional local store buffers, the process repeats by obtaining a new local store buffer at step 400. Otherwise, if there are no additional local store buffers, the process is complete.

If an atomic test-and-set operation is used at steps 420 and 440, then all duplicates in the global store buffer can be completely prevented (i.e., the global store buffer becomes a true set, rather than the bag as it existed in the local store buffer). In one embodiment, considerably cheaper non-atomic operations are used to implement steps 420 and 440. In that case most of the duplicates are removed as well.

Local Store Buffer Shrinking

Due to the nature of many computer programs, the same objects will be repeatedly updated. When the same objects are repeatedly updated, a plurality of duplicates will exist in that thread's local store buffer. When using a duplicate prevention scheme, such as the scheme described in connection with FIG. 4, the chunk in the global store buffer will not get filled completely because the space used for duplicates in the local store buffer is not transferred when the object pointers are flushed. In one embodiment, when there is room left in the chunk allocated to the global store buffer, a local store buffer shrinking scheme is employed by an embodiment of the invention.

Figure 7:
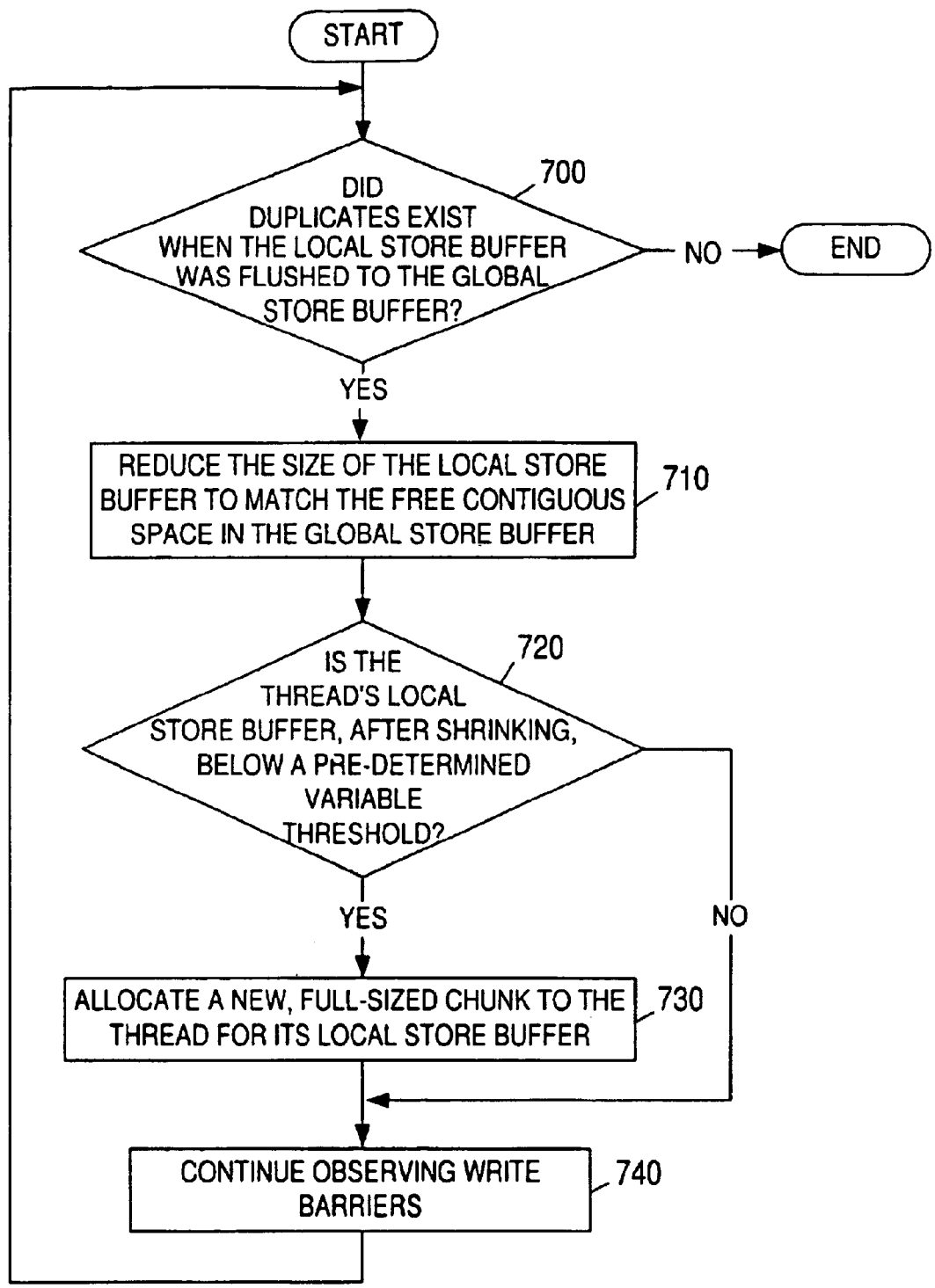
FIG. 7 is a flowchart of local store buffer shrinking in accordance with an embodiment of the present invention.

FIG. 7 is a flowchart of local store buffer shrinking according to this embodiment. At step 700 it is determined whether duplicates existed when the local store buffer was flushed to the global store buffer. This occurs, for instance, when the duplicate prevention embodiment described in FIG. 4 is employed. If duplicates did not exist in the local store buffer, then the process is complete. Otherwise, at step 710, the thread's local store buffer gets reduced in size to match the amount of free contiguous space in the global store buffer's chunk. This size reduction can be achieved, for instance, by adjusting the stack top pointer of the local store buffer before resuming application code execution.

Next, at step 720, it is determined whether the thread's local store buffer, after shrinking, is below a pre-determined, variable threshold. When then remaining chunk size is below the predetermined, variable threshold, the remaining chunk's space can be ignored and a new full-sized chunk gets allocated and dedicated to the current thread at step 730. Thereafter, at step 740, write barriers continue to be observed and the process repeats at step 700. If at step 720 the thread's local store buffer, after shrinking, was not below the predetermined threshold, flow proceeds directly to step 740 and write barriers continue to be observed.

By way of example, if one chooses for example 4 kilobytes (KB) as a maximum chunk size and 1 KB as a minimum chunk size for the local store buffer, then the space overhead over a gap-free global store buffer is bounded by 25%. One should note, however, that this is an example only. The maximum and minimum chunk sizes for the local store buffer, and hence the bounding of the space overhead for the global store buffer will vary with different applications. If a thread becomes inactive, its chunk is assigned to a pool of available chunks, which is initially empty. Chunk allocation can draw from this free list, in addition to the normal allocation of a new full-sized chunk.

When a global use of the remembered set occurs, such as garbage collection or persistent checkpointing, all local store buffers are flushed to the global store buffer, the whole global store buffer is processed and chunk allocation starts over from scratch, (i.e., each active thread gets a newly created chunk).

Buffer Overflow and User Traps

When the thread's local store buffer overflows at step 310 of FIG. 3, there are various ways that different embodiments of the invention detect and handle the overflowed buffer. In some operating systems, it is useful to have memory protection mechanisms at the end of each local store buffer's stack When an updated entity is to be written to that memory location in the stack, the program sends a signal indicating that it is time to flush the local store buffer to the global store buffer.

Figure 5:
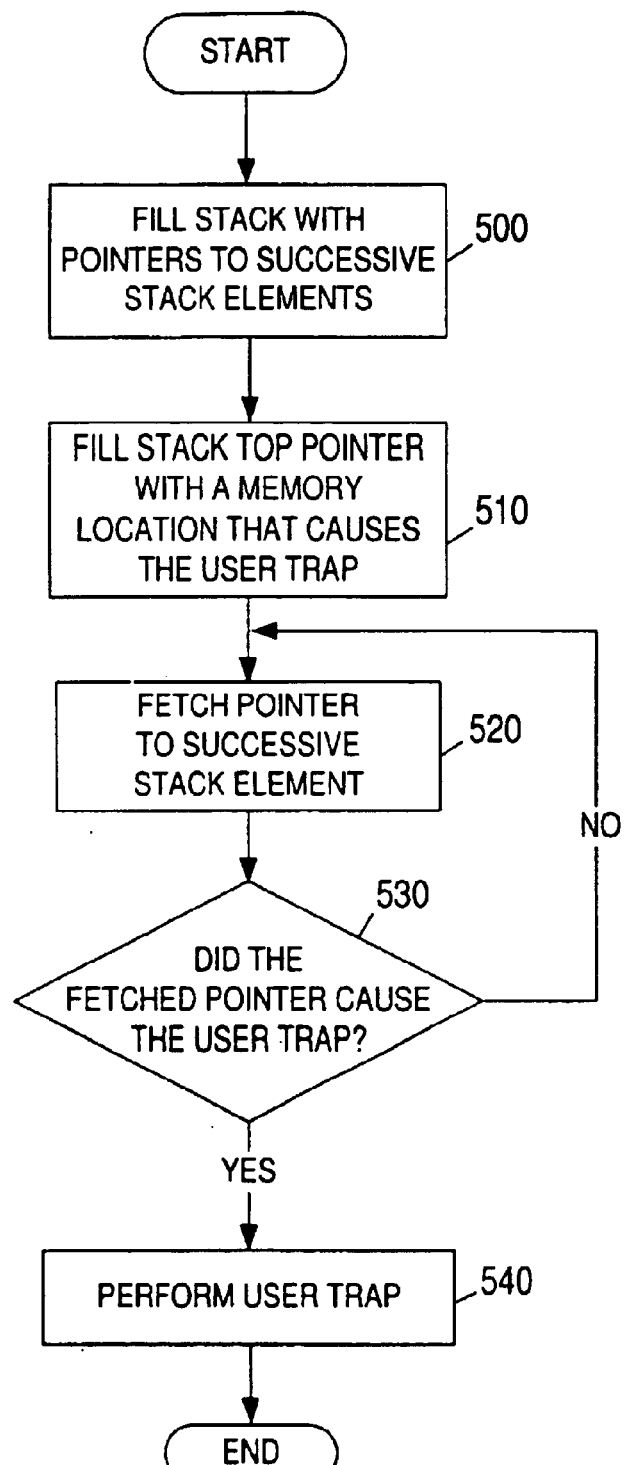
FIG. 5 is a flowchart of a user trap in accordance with an embodiment of the present invention.

In some operating systems, however, the memory protection mechanism requires to many instructions to be beneficial. Thus, in another embodiment, a user trap scheme is implemented. FIG. 5 is a flowchart of the user trap scheme in accordance with an embodiment of the present invention. First, at step 500, the stack is filled with pointers to successive stack elements. Thus, at location one of the stack, the memory address of location two is placed therein. Likewise, at location two of the stack is the address to location three. Then, at the last entry of the stack, a location is pushed which causes the trap to be initiated at step 510.

Then, when an updated entry is ready to be pushed onto the stack, the pointer to the successive stack element is fetched at step 520. Next, it is determined that if the pointer fetched at step 520 points to a location that causes the user trap. If the pointer does not initiate the user trap, then the updated entity is pushed on to the stack at step 530 and the process repeats at step 520 whenever a write barrier is observed. If, however, the address fetched at step 520 causes the trap, the trap is performed at step 540.

Thus, in the user trap embodiment, the last stack element contains an address that either causes the trap on dereferentiation or causes the trap when dereferenced (e.g., used by a load or store instruction). The user trap adds only 1 or 2 instructions to the write barrier code and is significantly less costly than the memory protection embodiment on certain operating systems. In particular, the Solaris operating system responds better to a user trap then a memory protection mechanism. This operating system offers such a user trap through the following declaration:

include</sys/utrap.h>

Embodiment of Computer Execution Environment (Hardware)

Figure 6:
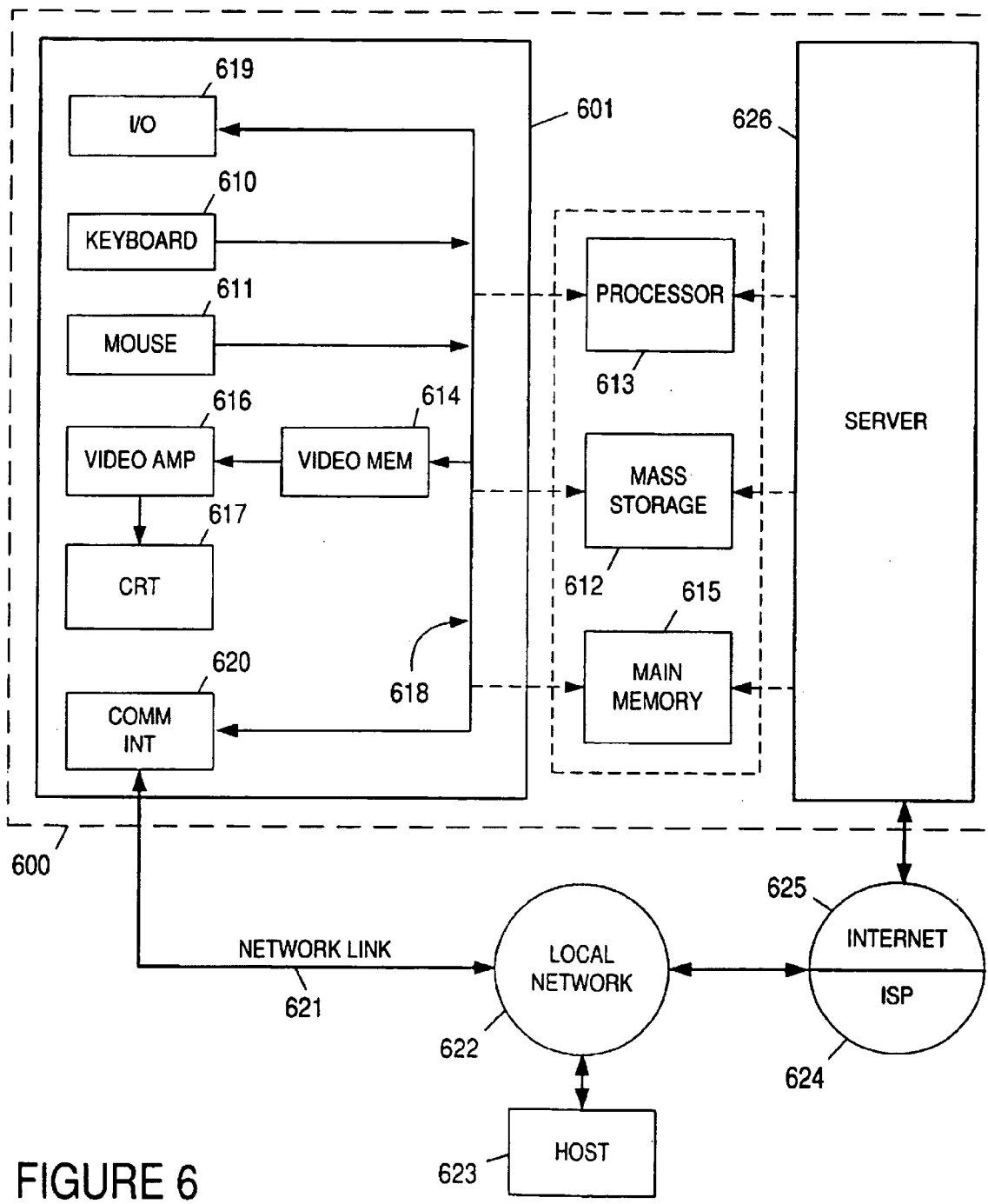
FIG. 6 shows an embodiment of a computer execution environment in which one or more embodiments of the present invention can be implemented.

An embodiment of the invention can be implemented as computer software in the form of computer readable program code executed in a general purpose computing environment such as environment 600 illustrated in FIG. 6, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to central processing unit (CPU) 613. Other suitable input devices maybe used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. Server 626 symbolically is represented in FIG. 6 as one unit, but server 626 can also be distributed between multiple "tiers". In one embodiment, server 626 comprises a middle and back tier where application logic executes in the middle tier and persistent data is obtained in the back tier. In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output.

Computer 601 includes a video memory 614, main memory 615 and mass storage 612, all coupled to bi-directional system bus 618 along with keyboard 610, mouse 611 and processor 613. As with processor 613, in various computing environments, main memory 615 and mass storage 612, can reside wholly on server 626 or computer 601, or they maybe distributed between the two. Examples of systems where processor 613, main memory 615, and mass storage 612 are distributed between computer 601 and server 626 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code maybe executed by processor 613 as it is received, and/or stored in mass storage 612, or other non-volatile storage for later execution. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 625, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for bag-to-set, buffering remembered set is described in conjunction with one or more specific embodiments. The invention is defined by the claims and their full scope of equivalents.

What is claimed is:

1. A method for providing a remembered set comprising:
   maintaining the remembered set as a bag;
   identifying when an event occurs;
   transforming the remembered set into a set when the event occurs, wherein the step of transforming comprises:
   obtaining a plurality of thread local store buffers; and
   flushing the thread local store buffers to a global store buffer.

2. The method of claim 1 wherein the step of flushing further comprises:
   eliminating a plurality of objects in the global store buffer that reside in the thread local store buffers wherein the objects are duplicates.

3. The method of claim 2 wherein the step of eliminating further comprises:
   determining whether one or more dedicated mark bits are set in the objects referenced by the thread local store buffers; and
   pushing the objects to the global store buffer, if said mark bits are not set.

4. The method of claim 2 wherein the step of flushing further comprises:
   allocating a chunk in the global store buffer wherein the chunk is smaller than a current buffer in the thread local store buffers; and
   shrinking the current buffer to the size of the chunk.

5. The method of claim 4 further comprising:
   determining a variable threshold.

6. The method of claim 5 further comprising:
   failing to shrink the current buffer to the size of the chunk if the variable threshold is larger than the chunk.

7. The method of claim 1 wherein the event occurs when the thread local store buffers have overflowed.

8. The method of claim 7 wherein the step of identifying further comprises:
   using a memory protection mechanism to determine when the thread local store buffers has have overflowed.

9. The method of claim 7 wherein the step of identifying further comprises:
   using a user trap to determine when the thread local store buffers has have overflowed.

10. The method of claim 9 wherein the user trap comprises:
    filling a stack with a plurality of pointers to successive stack elements;
    filling a top of the stack with a pointer to the user trap;
    fetching a current pointer from the pointers to successive stack elements;
    determining whether the current pointer is the pointer to the user trap; and
    performing the user trap, if the current pointer is the pointer to the user trap.

11. The method of claim 1 wherein the step of flushing further comprises:
    allocating a chunk in the global store buffer wherein the chunk is the same size as one of the thread local store buffers.

12. A remembered set comprising:
    a remembered set configured to be maintained as a bag;
    an event configured to be identified when the event occurs; and
    a second remembered set configured to be transformed from the first remembered set when the event occurs, wherein the second remembered set is a set and comprises a flushing mechanism configured to flush a plurality of thread local store buffers into the a global store buffer.

13. The remembered set of claim 12 wherein the flushing mechanism further comprises:
    a plurality of objects that reside in the thread local store buffers configured to be eliminated from the global store buffer, wherein the objects are duplicates.

14. The remembered set of claim 13 wherein the flushing mechanism further comprises:
    one or more dedicated mark bits in the objects referenced by the thread local store buffers wherein the dedicated mark bits are configured to be determined if said mark bits are set and wherein the objects are configured to be pushed onto the global store buffer, if said mark bits are not set.

15. The remembered set of claim 13 wherein the flushing mechanism further comprises:
    a chunk in the global store buffer configured to be allocated wherein the chunk is smaller than a current buffer in the thread local store buffers and the current buffer is configured to be shrunk to the size of the chunk.

16. The remembered set of claim 15 further comprising:
    a variable threshold configured to be determined.

17. The remembered set of claim 16 further comprising:
    the current buffer configured not to be shrunk to the size of the chunk if the variable threshold is larger than the chunk.

18. The remembered set of claim 12 wherein the event occurs when the thread local store buffers have overflowed.

19. The remembered set of claim 18 wherein the event further comprises:
    a memory protection mechanism configured to determine when the thread local store buffers have overflowed.

20. The remembered set of claim 18 wherein the event further comprises:
    a user trap configured to determine when the thread local store buffers have overflowed.

21. The remembered set of claim 20 wherein the user trap comprises:
    a stack configured to be filled with a plurality of pointers to successive stack elements;
    a top of the stack configured to be filled with a pointer to the user trap; and
    a current pointer configured to be fetched from the pointers to successive stack elements,
    wherein it is determined whether the current pointer is the pointer to the user trap and the user trap is configured to be performed if the current pointer is the pointer to the user trap.

22. The remembered set of claim 12 wherein the flushing mechanism further comprises:
    a chunk in the global store buffer configured to be allocated wherein the chunk is the same size as one of the thread local store buffers.

23. A computer program product comprising:
    a computer usable medium having computer readable program code embodied therein configured to provide a remembered set, the computer readable program code comprising:
    computer readable code configured to cause a computer to maintain the remembered set as a bag;
    computer readable code configured to cause the computer to identify when an event occurs; and computer readable code configured to cause the computer to transform the remembered set into a set when the event occurs, wherein the computer readable code configured to cause a computer to transform comprises:

computer readable code configured to cause the computer to obtain a plurality of thread local store buffers; and computer readable code configured to cause the computer to flush the thread local store buffers to a global store buffer.

24. The computer program product of claim 23 wherein the computer readable code configured to cause the computer to flush further comprises:

computer readable code configured to cause the computer to eliminate a plurality of objects in the global store buffer that reside in the thread local store buffers wherein the objects are duplicates.

25. The computer program product of claim 24, wherein the computer readable code configured to cause the computer to eliminate further comprises:

computer readable code configured to cause the computer to determine whether one or more dedicated mark bits are set in the objects referenced by the thread local store buffers; and computer readable code configured to cause the computer to mark a plurality of the dedicated mark bits, if said mark bits are not set.

26. The computer program product of claim 24 wherein the computer readable code configured to cause the computer to flush further comprises:

computer readable code configured to cause the computer to allocate a chunk in the global store buffer, wherein the chunk is smaller than a current buffer in the thread local store buffers; and computer readable code configured to cause the computer to shrink the current buffer to the size of the chunk.

27. The computer program product of claim 26 further comprising:

computer readable code configured to cause the computer to determine a variable threshold.

28. The computer program product of claim 27 further comprising:

computer readable code configured to cause the computer to fail to shrink the current buffer to the size of the chunk if the variable threshold is larger than the chunk.

29. The computer program product of claim 23 wherein the event occurs when the thread local store buffers have overflowed.

30. The computer program product of claim 29 wherein the computer readable code configured to cause the computer to identify further comprises:

computer readable code configured to cause the computer to use a memory protection mechanism to determine when the thread local store buffers have overflowed.

31. The computer program product of claim 29 wherein the computer readable code configured to cause the computer to identify further comprises:

computer readable code configured to cause the computer to use a user trap to determine when the thread local store buffers have overflowed.

32. The computer program product of claim 31 wherein the user trap comprises:

computer readable code configured to cause the computer to fill a stack with a plurality of pointers to successive stack elements;

computer readable code configured to cause the computer to fill a top of the stack with a pointer to the user trap;

computer readable code configured to cause the computer to fetch a current pointer from the pointers to successive stack elements;

computer readable code configured to cause the computer to determine whether the current pointer is the pointer to the user trap; and computer readable code configured to cause the computer to perform the user trap, if the current pointer is the painter to the user trap.

33. The computer program product of claim 23 wherein the computer readable code configured to cause the computer to flush further comprises:

computer readable code configured to cause the computer to allocate a chunk in the global store buffer wherein the chunk is the same size as one of the thread local store buffers.

* * * * *

UNITED STATES PATENT AND TRADEMARK OFFICE
CERTIFICATE OF CORRECTION

PATENT NO. : 6,829,686 B2
DATED : December 7, 2004
INVENTOR(S) : Bernd J.W. Mathiske et al.

It is certified that error appears in the above-identified patent and that said Letters Patent is hereby corrected as shown below:

Column 11,
Lines 38 and 42, please remove the word "has" after the word "buffers."

Column 12,
Line 3, please remove the word "the" after the word "into."

Column 14,
Line 34, please replace the word "painter" with -- pointer --.

Signed and Sealed this

Nineteenth Day of April, 2005

JON W. DUDAS
*Director of the United States Patent and Trademark Office*